United States Patent
Shen et al.

(10) Patent No.: US 9,007,988 B2
(45) Date of Patent: Apr. 14, 2015

(54) PARTIAL CQI FEEDBACK IN WIRELESS NETWORKS

(75) Inventors: Zukang Shen, Richardson, TX (US); Tarik Muharemovic, Dallas, TX (US); Runhua Chen, Dallas, TX (US); Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1080 days.

(21) Appl. No.: 12/367,519

(22) Filed: Feb. 7, 2009

(65) Prior Publication Data

US 2009/0201825 A1 Aug. 13, 2009

Related U.S. Application Data

(60) Provisional application No. 61/027,596, filed on Feb. 11, 2008, provisional application No. 61/028,023, filed on Feb. 12, 2008, provisional application No. 61/029,678, filed on Feb. 19, 2008.

(51) Int. Cl.
| | |
|---|---|
| H04W 72/04 | (2009.01) |
| H04L 5/00 | (2006.01) |
| H04L 1/00 | (2006.01) |
| H04L 25/03 | (2006.01) |

(52) U.S. Cl.
CPC ............ *H04L 5/0053* (2013.01); *H04L 1/0026* (2013.01); *H04L 1/0027* (2013.01); *H04L 1/0029* (2013.01); *H04L 5/0048* (2013.01); *H04L 5/0092* (2013.01); *H04L 25/03343* (2013.01); *H04L 2025/03802* (2013.01)

(58) Field of Classification Search
None
See application file for complete search history.

(56) References Cited

U.S. PATENT DOCUMENTS

| | | | |
|---|---|---|---|
| 2007/0217540 A1* | 9/2007 | Onggosanusi et al. | 375/267 |
| 2008/0207135 A1 | 8/2008 | Varadarajan et al. | |
| 2008/0219370 A1 | 9/2008 | Onggosanusi et al. | |
| 2008/0298502 A1* | 12/2008 | Xu et al. | 375/299 |
| 2009/0080569 A1* | 3/2009 | Han et al. | 375/316 |
| 2009/0109873 A1 | 4/2009 | Shen | |
| 2009/0109908 A1 | 4/2009 | Shen | |
| 2009/0163142 A1* | 6/2009 | Pi et al. | 455/62 |
| 2009/0270108 A1* | 10/2009 | Xu | 455/452.2 |
| 2010/0002664 A1* | 1/2010 | Pan et al. | 370/338 |
| 2010/0099364 A1* | 4/2010 | Yang et al. | 455/69 |

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 8, V8.4.0, Valbonne, France, Sep. 2008, pp. 1-80.

3GPP, "3rd Generation Partnership Project; Technical Specification Group Radio Access Network; Evolved Universal Terrestrial Radio Access (E-UTRA); Multiplexing and Channel Coding", 3GPP TS 36.212, Release 8, V8.4.0, Valbonne, France, Sep. 2008, pp. 1-56.

* cited by examiner

*Primary Examiner* — Alex Skripnikov

(74) *Attorney, Agent, or Firm* — Ronald O. Neerings; Frank D. Cimino

(57) ABSTRACT

Within a wireless network, feedback information from user equipment (UE) to a control node (eNodeB) is necessary to support various functions. A UE receives an allocation from the eNodeB comprising a plurality of periodic transmission instances for a channel quality indicator (CQI) and a schedule comprising a plurality of periodic transmission instances for a rank indicator (RI), wherein the CQI comprises RI and other CQI fields. The UE then transmits an RI without transmitting the other CQI fields in a transmission instance allocated for both RI and other CQI fields.

31 Claims, 8 Drawing Sheets

US 9,007,988 B2

PARTIAL CQI FEEDBACK IN WIRELESS NETWORKS

CLAIM OF PRIORITY

This application for Patent claims priority to U.S. Provisional Application No. 61/027,596 entitled "Partial CQI Feedback" filed Feb. 11, 2008, which is incorporated by reference herein. This application for Patent also claims priority to U.S. Provisional Application No. 61/028,023 entitled "Partial CQI Feedback" filed Feb. 12, 2008, which is incorporated by reference herein. This application for Patent also claims priority to U.S. Provisional Application No. 61/029,678 entitled "Partial CQI Feedback" filed Feb. 19, 2008, which is incorporated by reference herein.

FIELD OF THE INVENTION

This invention generally relates to wireless communication, and in particular to providing feedback in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNodeB or eNB). In general, eNodeB hardware, when deployed, is fixed and stationary, while the UE hardware is portable.

In contrast to eNodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the eNodeB, whereas downlink (DL) refers to communication from the eNodeB to the mobile UE. Each eNodeB contains radio frequency transmitter(s) and the receiver(s) used to communicate directly with the mobiles, which move freely around it. Similarly, each mobile UE contains radio frequency transmitter(s) and the receiver(s) used to communicate directly with the eNodeB. In cellular networks, the mobiles cannot communicate directly with each other but have to communicate with the eNodeB.

To support dynamic scheduling and multiple-input multiple-output (MIMO) transmission in downlink (DL), several control information feedback bits must be transmitted in uplink. For example, MIMO related feedback information includes: Index of a selected precoding matrix (PMI); transmission rank indicator (RI), which corresponds to the number of useful spatial transmission layers; and the recommended/supportable modulation and coding schemes (MCS). MCS feedback is an index that is associated with a certain channel coding rate value and modulation scheme (e.g. QPSK, 16 QAM, 64 QAM). Note that PMI is needed only for closed-loop spatial multiplexing where channel dependent precoding is employed. For open-loop spatial multiplexing, only MCS and RI are applicable.

Control information feedback bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed cyclic redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACK-NAK, or any other equivalent term. Here, ACK refers to acknowledgement (successful CRC check) and NACK refers to negative-acknowledgement (failed CRC check). This uplink control information is typically transmitted using the physical uplink control channel (PUCCH), as defined by the 3GPP working groups (WG), for evolved universal terrestrial radio access (E-UTRA). The E-UTRA is sometimes also referred to as 3GPP long-term evolution (3GPP LTE). The structure of the PUCCH is designed to provide sufficiently high transmission reliability.

In addition to PUCCH, the E-UTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. Coded and data bits are multiplexed onto modulation symbols, which are mapped to different resource elements (RE), where an RE is defined as the smallest granularity of a time-frequency resource. A resource block (RB) is defined as the aggregation of several REs. The general operations of the physical channels are described in the E-UTRA specifications, for example: "$3^{rd}$ Generation Partnership Project; Technical Specification Group Radio Access Network; Evolved Universal Terrestrial Radio Access (E-UTRA); Physical Channels and Modulation (TS36.211, Release 8)."

The uplink control information is transmitted on PUCCH, if there is no concurrent transmission of data in the uplink, as defined by 3GPP E-UTRA. In addition, 3GPP E-UTRA defines that in case both uplink control information and data need to be transmitted in the same uplink subframe, the uplink control information shall be transmitted on the allocated PUSCH resources, together with data.

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

Turbo codes are a class of high-performance error correction codes developed in 1993 which are finding use in deep space satellite communications and other applications where designers seek to achieve maximal information transfer over a limited-bandwidth communication link in the presence of data-corrupting noise. The channel coding scheme for transport blocks in LTE is Turbo Coding with a coding rate of R=1/3, using two 8-state constituent encoders and a contention-free quadratic permutation polynomial (QPP) turbo code internal interleaver. Trellis termination is used for the turbo coding. Before the turbo coding, transport blocks are segmented into byte aligned segments with a maximum information block size of 6144 bits. Error detection is supported by the use of 24 bit CRC. The 1/3 coding rate triples the bit-count for transmission of the block. The general operations of channel coding are described in the E-UTRA specifications, for example: "$3^{rd}$ Generation Partnership Project; Technical Specification Group Radio Access Network; Evolved Universal Terrestrial Radio Access (E-UTRA); Multiplexing and channel coding (TS36.212, Release 8)." Convolutional codes are also used in 3GPP E-UTRA for downlink and uplink control channels.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

MIMO related feedback includes, but is not limited to, the following fields: Rank indicator (RI); Modulation and coding scheme (MCS); and precoding matrix indicator (PMI). Multiple MCS may be required if spatial multiplexing is employed. Multiple MCS can be expressed in terms of a baseline MCS and a delta MCS relative to the baseline MCS. Without loss generality, in this disclosure, CQI may be denoted as the MIMO related feedback to its entirety, including but not limited to RI, MCS, and PMI. Alternatively, the term CQI is also used to refer only to MCS feedback which is differentiated from PMI and RI. In this disclosure, we use the first definition of CQI although the materials described in this disclosure apply regardless of the terminology and the scope for CQI. We note again that PMI is applicable only for closed-loop spatial multiplexing and not for open-loop spatial multiplexing.

In some embodiments of the invention, the CQI feedback can be limited due to the limited available resources. An exemplary embodiment is that if CQI feedback is performed on uplink control channel, e.g. PUCCH in 3GPP LTE, there are only 20 coded bits per subframe. If all MIMO related feedback is sent on PUCCH, only limited coding gain for the uplink control channel is obtained. Thus, it is beneficial to enable partial CQI feedback in order to provide better protection due to a CQI coding rate having a high coding gain.

It is possible that different CQI reports on different time instances contain different CQI fields, such that multiple CQI reports can be combined to provide a full or more complete CQI reports. In other words, different CQI reports on different time instances can be complimentary to each other. However, it is not precluded that eNodeB can use each CQI report alone, even when the CQI report contains partial CQI information, such as not including all CQI fields.

Partial CQI feedback may be enabled to improve CQI detection performance. Partial CQI reporting is particularly useful for UEs with coverage issues, such as cell-edge UEs. It is certainly not precluded that full CQI reports are employed for cell interior UEs without coverage problem while partial CQI feedback is employed for cell-edge UEs.

In one embodiment of partial CQI feedback, in the subframes where Rank (RI) and MCS/PMI originally coexist, MCS/PMI is dropped and only Rank (RI) is transmitted, as will be described in more detail below.

Figure 1:
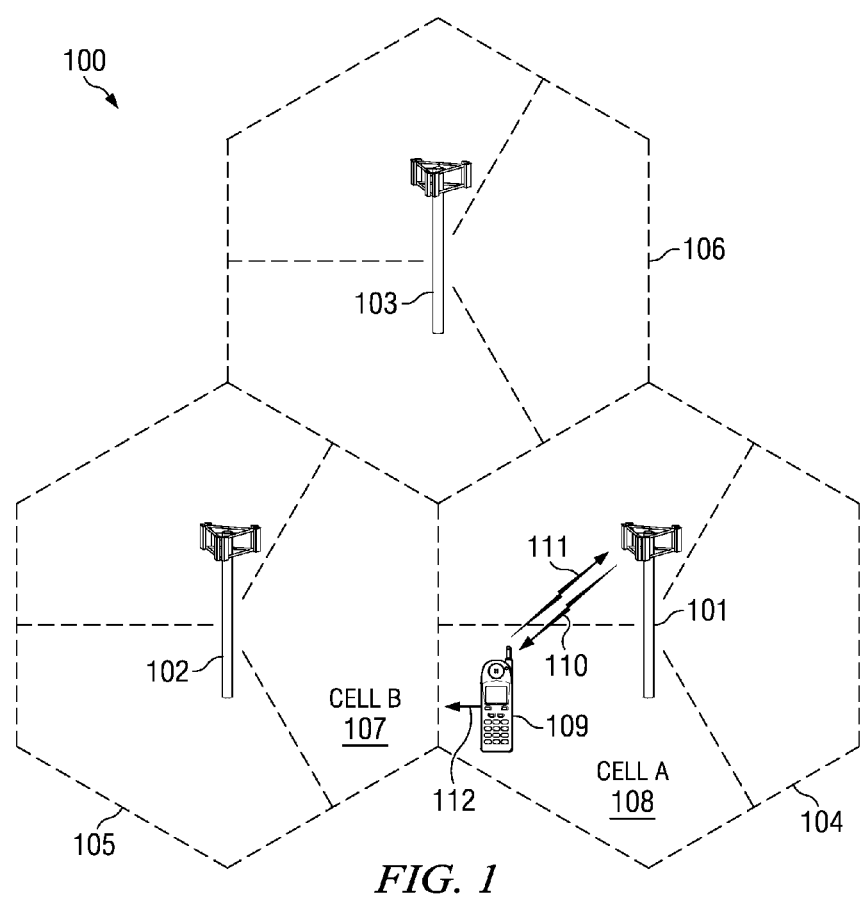
FIG. 1 is a pictorial of an illustrative telecommunications network that employs an embodiment of partial CQI feedback transmission on PUCCH or on PUSCH.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

Cell A 108 allocates a set of resource blocks for UE 109 for its PUSCH transmission, either by dynamic scheduling or by semi-persistent scheduling. When UE 109 needs to feedback uplink control information in the same uplink subframe with data, UE 109 transmits both the uplink control information and data in the allocated PUSCH resource blocks. Similarly, Cell A 108 allocates a resource block for UE 109 for its PUCCH transmission, either by dynamic scheduling or by semi-persistent scheduling. When UE 109 needs to feedback uplink control information without data, UE 109 transmits the uplink control information in the allocated PUCCH resource block.

As discussed above, channel quality indicator (CQI) needs to be reported (fed back) in uplink (UL) to support dynamic scheduling and multiple-input-multiple-output (MIMO) transmission on downlink (DL). In 3GPP E-UTRA, if a UE (user equipment) has no uplink data transmission, its CQI is transmitted on a dedicated UL control channel (i.e. PUCCH). To support dynamic scheduling and multiple-input multiple-output transmission in downlink (DL), several control signaling bits must be fed back in uplink (UL). For example, as indicated above, MIMO related feedback information includes: index of a selected precoding matrix (PMI)—applicable only for closed-loop spatial multiplexing; transmission rank indicator (RI), which is the number of useful spatial transmission layers; and supportable modulation and coding schemes (MCS).

RI and the other CQI field(s) (MCS and/or PMI) can be jointly coded and transmitted in UL. However, since rank information determines the length of the CQI information bits and consequently the coding scheme, blind decoding is necessary for joint coding between RI and the other CQI field(s) (MCS and/or PMI), which may not provide satisfactory performance. In this disclosure, separate RI and MCS/PMI feedback schemes are described. With separate RI and MCS/PMI transmission, one or more SC-FDMA symbols can be exclusively dedicated for RI transmission. Furthermore, frequency diversity can be easily achieved by repeating the RI bits on both slots of a subframe. Furthermore, the encoded RI bits may be mapped to a certain number of REs or modulation symbols on PUSCH. Since the length of the overall CQI information bits depends on RI, the joint RI and MCS/PMI transmission scheme may assume the worst (or longest) CQI length, irrespective of the transmission RI value. Whenever RI is decoded erroneously, CQI is incorrectly received. Moreover, for CQI length shorter than the worst case, some coding gains may be lost since the longest CQI length is always assumed.

Note the number of CQI information bits is dependent on RI. For wideband MIMO-related feedback in UL, Table 1 shows exemplary numbers of RI and MCS/PMI bits for joint and separate RI and MCS/PMI transmission. For joint transmission, to avoid blind decoding at eNodeB, the worst case CQI length needs to be used, irrespective of the RI value.

For PUCCH, a cyclically shifted or phrase ramped CAZAC-like sequence is transmitted in each symbol. Different cyclic shifts or different amounts of phrase ramping can be used to multiplex more than one UEs' PUCCH transmission in the same physical resource block. A resource block in 3GPP E-UTRA is defined as 12 consecutive resource elements in frequency domain, wherein each resource element is of 15 kHz. Therefore, at most 12 CQI UEs can be multiplexed in the same PUCCH resource block. For CQI transmission on PUCCH, with QPSK modulation, 20 coded CQI bits are available per UE within one subframe. For ACK/NAK transmission, additional orthogonal covering can be applied across the symbols in the time domain, thereby increasing the ACK/NAK multiplexing up to 36 UEs per PUCCH resource block. However, due to spillover between consecutive cyclic shifts, it is recommended that not all 12 cyclic shifts are utilized.

In each SC-FDMA symbol, a cyclically shifted or phase ramped CAZAC-like sequence is transmitted. The CAZAC-like sequence in a RS SC-FDMA symbol is un-modulated. The CAZAC-like sequence in a data SC-FDMA symbol is modulated by the data symbol. Here the data symbol can be the ACK/NAK symbol, scheduling request indicator (SRI) symbol, Rank Indicator (RI) symbol, or other CQI-related symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff—Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, \quad 0 \leq n \leq M_{sc}^{RS} - 1$$

where $M_{sc}^{RS} = 12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

Number of RI and MCS/PMI Bits per Subframe

|  | 2-Tx Antennas | | 4-Tx Antennas | |
| --- | --- | --- | --- | --- |
|  | RI = 1 | RI = 2 | RI = 1 | RI > 1 |
| Separate RI | 1 RI Bit<br>6 MCS/PMI Bits | 1 RI Bit<br>8 MCS/PMI Bits | 2 RI Bits<br>8 MCS/PMI Bits | 2 RI Bits<br>11 MCS/PMI Bits |
| Joint, fixed (no blind decoding) | 9 Bits, RI + MCS/PMI | | 13 Bits, RI + MCS/PMI | |

Figure 2:
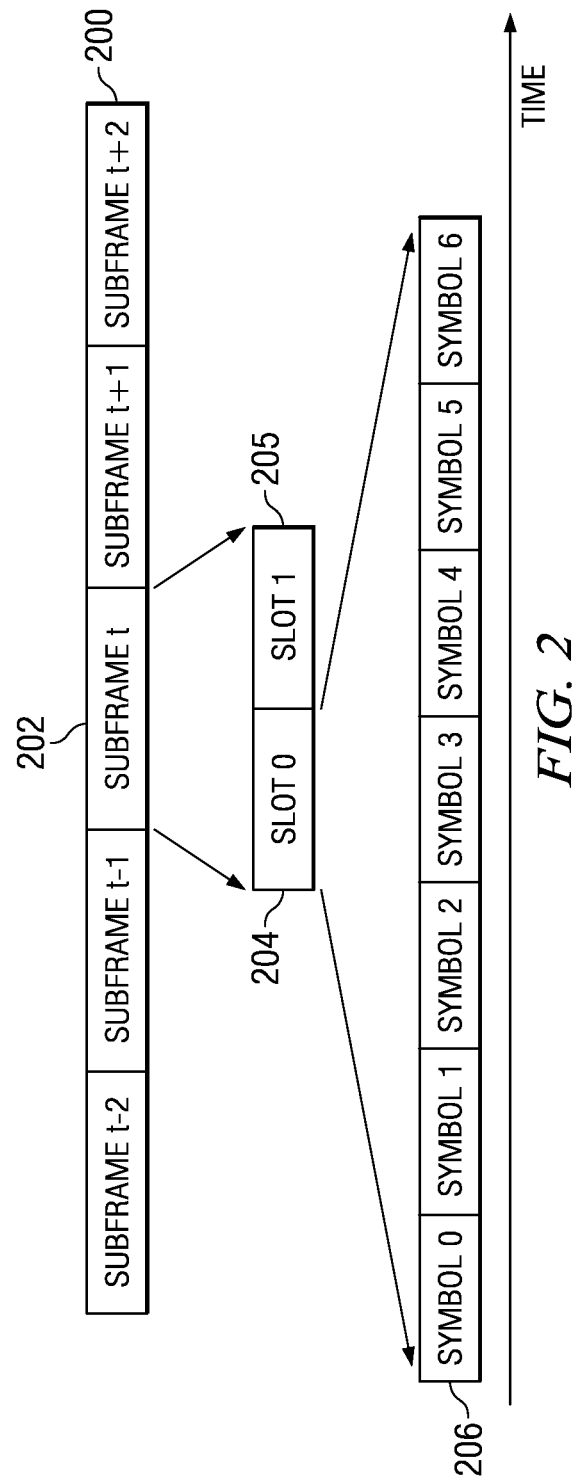
FIG. 2 is an example frame structure for use in transmission between nodes in the network of FIG. 1.

FIG. 2 is an example frame structure 200 for use in transmission between nodes in the network of FIG. 1. Each frame 200 contains several subframes, as indicated generally at 202. In turn, subframe 202 contains two slots 204, 205. Each slot contains a number of information carrying symbols, generally indicated at 206. A cyclic prefix (CP) field (not shown) is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2.

TABLE 2

Definition of $\phi(n)$

| u | $\phi(0), \ldots, \phi(11)$ | | | | | | | | | | | |
| --- | --- | --- | --- | --- | --- | --- | --- | --- | --- | --- | --- | --- |
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |

TABLE 2-continued

Definition of φ(n)

| u | φ(0), . . . , φ(11) | | | | | | | | | | | |
|---|---|---|---|---|---|---|---|---|---|---|---|---|
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

The sequence in different data symbols in FIG. 2 can be different. In one embodiment, the sequences in different data symbols are cyclic shifted or phase ramped CAZAC-like sequences of a base sequence, with different amounts of cyclic shifts or phase ramps on different data symbols.

In 3GPP E-UTRA UL, single carrier FDMA (SC-FDMA) is adopted as the transmission scheme due to its low peak-to-average ratio (PAR) or cubic metric (CM) property. In the context of CQI transmission on PUCCH, SC-FDMA essentially means a UE can only transmit on one cyclic shift at each SC-FDMA symbol to keep the PAR/CM low.

The frame structure used in the PUSCH is similar to that illustrated in FIG. 2. Each resource block (RB) in PUSCH contains twelve resource elements, each of which covers a 15 kHz portion of the frequency spectrum. However, CDM is not employed in the PUSCH.

Figure 3:
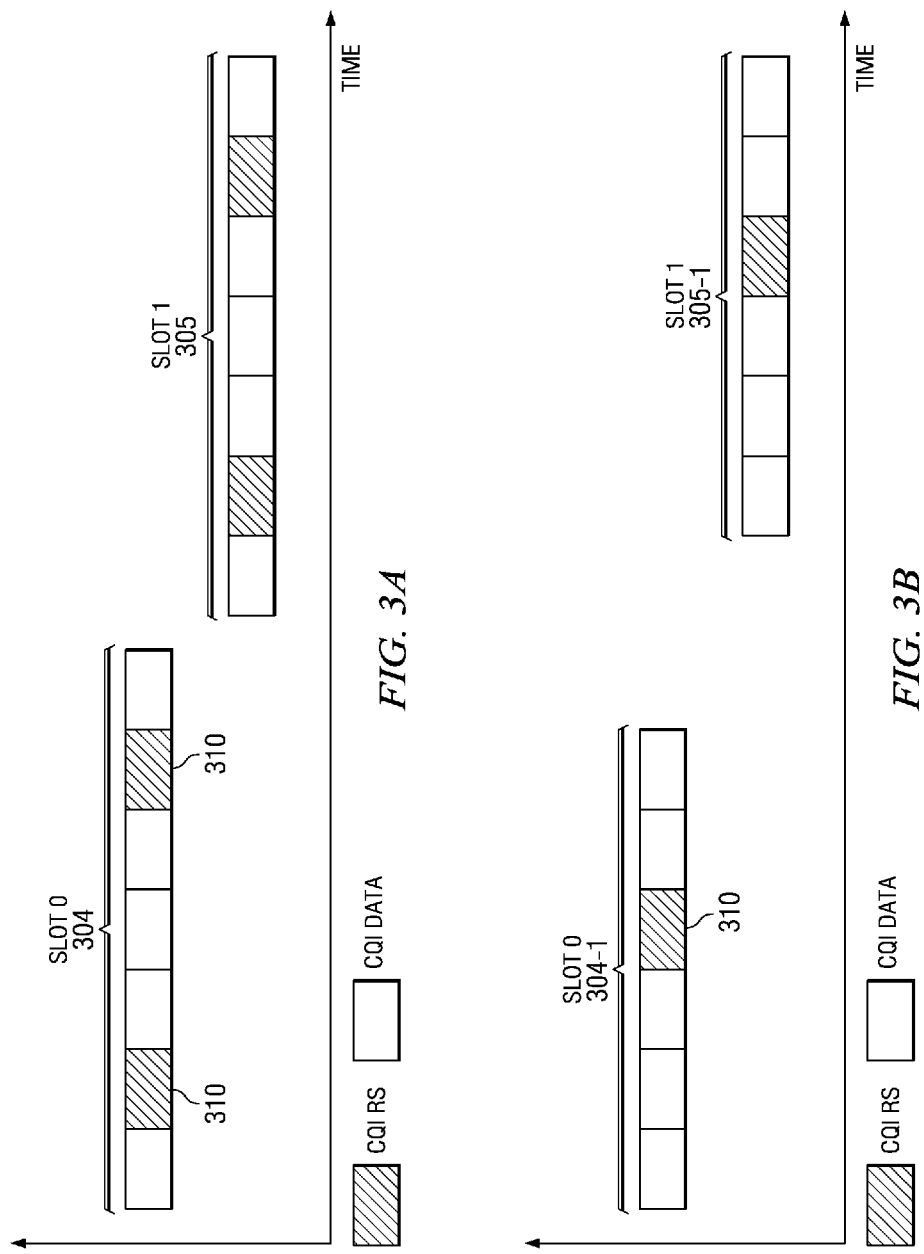
FIGS. 3A and 3B illustrate placement of reference symbols in the frame structure of FIG. 2 for use in PUCCH.

FIGS. 3A and 3B illustrate placement of reference signal symbols 310 in the frame structure of FIG. 2 for use in PUCCH. As discussed above, FIG. 3A illustrates a subframe with two slots 304, 305 in the normal CP case. Two reference symbols (RS) 310 are included within each slot. FIG. 3B illustrates a subframe with two slots 304-1, 305-1 in the extended CP case. In this case, only one reference symbol 310 is included in each slot. For PUSCH, the structure is similar except that only one RS is used in the normal CP case.

Figure 4:
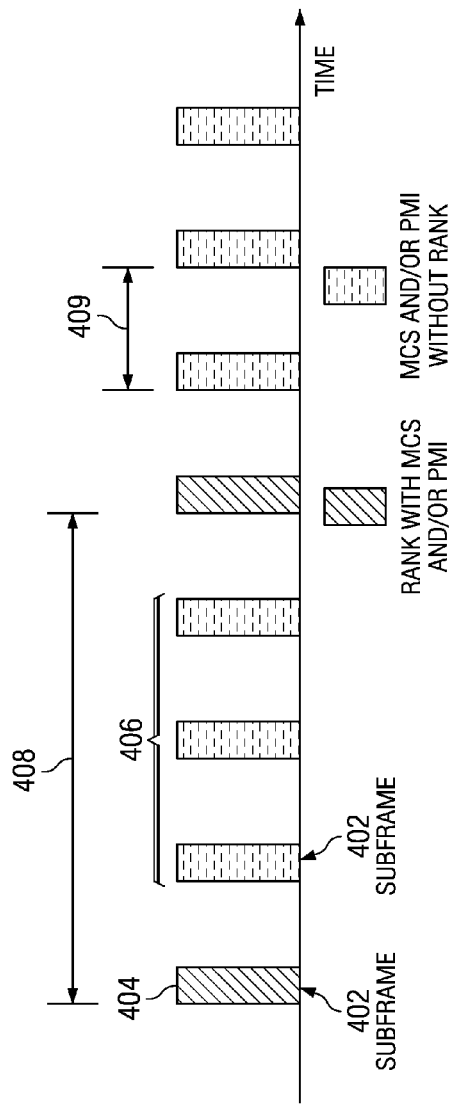
FIG. 4 is a time plot illustrating periodic Rank and partial MCS/PMI reporting using the structures of FIGS. 3A and 3B.

FIG. 4 is a time plot illustrating an example of periodic RI and MCS and/or PMI reporting subframes 402 using the structures of FIGS. 3A and 3B on PUCCH, for example. The RI reporting interval 408 can be different (longer) than the MCS/PMI reporting interval 409. Thus, in some MCS/PMI reporting subframes, there is no RI information, such as in subframes 406. For the MCS/PMI reporting where RI is included, such as in subframe 404, partial CQI reporting may be used. In this case, only partial or restricted MCS may be transmitted in subframe 404. To further reduce the number of CQI bits, PMI may be dropped from each subframe 404 containing RI.

Figure 5:
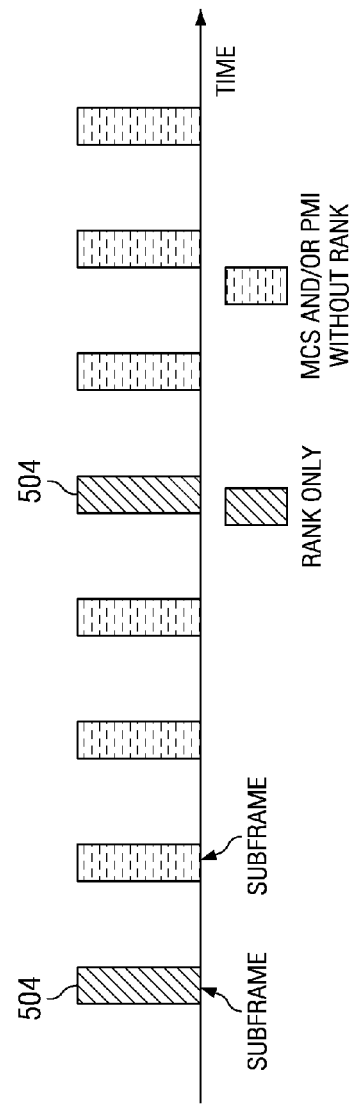
FIG. 5 is a time plot illustrating partial CQI feedback using the structures of FIGS. 3A and 3B, where MCS/PMI is dropped in Rank subframes.

FIG. 5 is a time plot illustrating partial CQI feedback using the structures of FIGS. 3A and 3B, where MCS/PMI is dropped in RI subframes. In the subframes 504 where RI and MCS/PMI would otherwise coexist, MCS/PMI is dropped and only RI is transmitted.

Still referring to FIG. 5, in subframe 504 where only RI is reported, the RI report can use a designated CQI reporting channel, that is, the UE-specific CQI channel on PUCCH that is allocated by the eNodeB that is serving the cell in which the UE is located. In 3GPP LTE, the CQI channel on PUCCH consists of 20 coded bits, referred to as PUCCH format 2, as described in more detail in $3^{rd}$ Generation Partnership Project; Technical Specification Group Radio Access Network; Evolved Universal Terrestrial Radio Access (E-UTRA); Physical Channels and Modulation (referred to as TS36.211, Release 8). Thus, a rate (20, 1) or rate (20, 2) coding scheme can be applied to the RI information bits, depending on the number of RI bits. One such coding is simply a repetition coding. Other coding schemes, such as block coding, are not precluded.

As mentioned above, multiple REs or symbols may be used to transmit RI bits. Denote n as the number of modulation symbols per UL SC-FDMA symbol that are used for the transmission of coded RI bits. Denote m as the number of UL SC-FDMA symbols, within a subframe, that contain coded RI modulation symbols. Therefore, there are a total of (nm) modulation symbols for the transmission of coded RI bits in a subframe. In 3GPP LTE UL, m can be 4 or 8. Without loss of generality, assuming QPSK (quaternary phase shift keying) as the modulation scheme for the transmission of coded RI bits, the number of coded RI bits per subframe is 2nm. Thus, the coding rate (or scheme) for 1 RI bit is (2nm, 1) and the coding rate (or scheme) for 2 RI bits is (2nm, 2). Since the number of RI bits is either 1 or 2, a simple repetition coding may be used. Table 2 shows an example of the coding scheme for one RI bit with n=3 and m=4, while Table 3 shows an example for two RI bits.

TABLE 2

Coding Scheme for 1 RI Bit, n = 3, m = 4

| RI Bit | Coded RI bits |
|---|---|
| 0 | 0 0 0 0 0 0 0 0 0 0 0 0 0 0 0 0 0 0 0 0 0 0 0 0 |
| 1 | 1 1 1 1 1 1 1 1 1 1 1 1 1 1 1 1 1 1 1 1 1 1 1 1 |

TABLE 3

Coding Scheme for 2 RI bits, n = 3, m = 4

| RI Bit | Coded RI bits |
|---|---|
| 00 | 0 0 0 0 0 0 0 0 0 0 0 0 0 0 0 0 0 0 0 0 0 0 0 0 |
| 01 | 0 1 0 1 0 1 0 1 0 1 0 1 0 1 0 1 0 1 0 1 0 1 0 1 |

TABLE 3-continued

Coding Scheme for 2 RI bits, n = 3, m = 4

| RI Bit | Coded RI bits |
|---|---|
| 10 | 1 0 1 0 1 0 1 0 1 0 1 0 1 0 1 0 1 0 1 0 1 0 1 0 |
| 11 | 1 1 1 1 1 1 1 1 1 1 1 1 1 1 1 1 1 1 1 1 1 1 1 1 |

Note the value for n can vary for different UEs. For example, for a UE scheduled with high modulation and coding scheme (MCS) for its UL data transmission, it is presumed that the UE has good channel gain. Thus, it is sufficient for such UE to transmit the coded RI bits on a small number of REs (or modulation symbols) to achieve the required target performance. On the other hand, for a UE scheduled with low MCS, it is common that this UE does not experience excellent channel condition. Thus, it is crucial for such UE to transmit the coded RI bits on a larger number of REs (or modulation symbols) to achieve the desired performance. In the current 3GPP compliant embodiment, the candidate values of n can be n=3, 6, 9, or 12. Note the candidate values of m are m=4 or 8. In other embodiments, the range of allowable parameters may be different.

It is not precluded that for simplicity, a fixed value of n and m is adopted to all UEs in the system for the transmission of coded RI bits. Moreover, it is possible to apply a cell-specific or eNodeB specific scrambling code or spreading code to randomize the RI interference from other cells. A scrambling code or spreading code can be applied to the UL SC-FDMA symbols (possibly including the DM RS SC-FDMA symbol) that contain coded RI symbols. The spreading codes can be applied on a slot basis or on a subframe basis.

It is preferable that the resource or channel used for RI transmission is the same as the resource or channel for the transmission of other CQI field(s) (e.g. MCS and/or PMI). For example, in case that RI and MCS/PMI are transmitted separately on uplink control channel, a common PUCCH channel can be used for the transmission of RI and MCS/PMI, at different time instances. One example of such common PUCCH channel is the CQI channel (PUCCH format 2), defined by a cyclic shift of a CAZAC-like sequence transmitted on a particular physical resource block. It is not precluded that different resources or channels can be used for separate RI and MCS/PMI transmissions.

When downlink data is received, ACK/NAK must be fed back in uplink. In the subframes where RI and ACK/NAK bits coexists in the same subframe, the ACK/NAK bit can be transmitted in the CQI reference signal (RS) symbols, e.g. using PUCCH format 2a, or PUCCH format 2b, as defined in TS 36211, release 8. Refer again to FIG. 3, where RS 310 is illustrated. Alternatively, the RI and ACK/NAK can be jointly coded and transmitted on the (UE-specific) CQI channel. In case RI and ACK/NAK are jointly coded, the coding scheme will be of rate (20, 1), (20, 2), (20, 3), or (20, 4), depending on the number of RI and ACK/NAK bits. Repetition coding or simple block coding scheme (e.g. Reed-Muller codes) can be applied.

Other embodiments of the proposed partial CQI feedback scheme can be applied similarly as the example in FIG. 5.

In another embodiment, for the subframes where the proposed partial CQI (including RI) reporting is applied, RI can be multiplexed with other CQI (e.g. partial MCS or PMI) information field(s) by TDM (time division multiplexing). For example, RI and other (partial) CQI information bits are separately coded and mapped to different symbols (or OFDM symbols, SC-FDMA symbols) within the reporting subframe.

Figure 6:
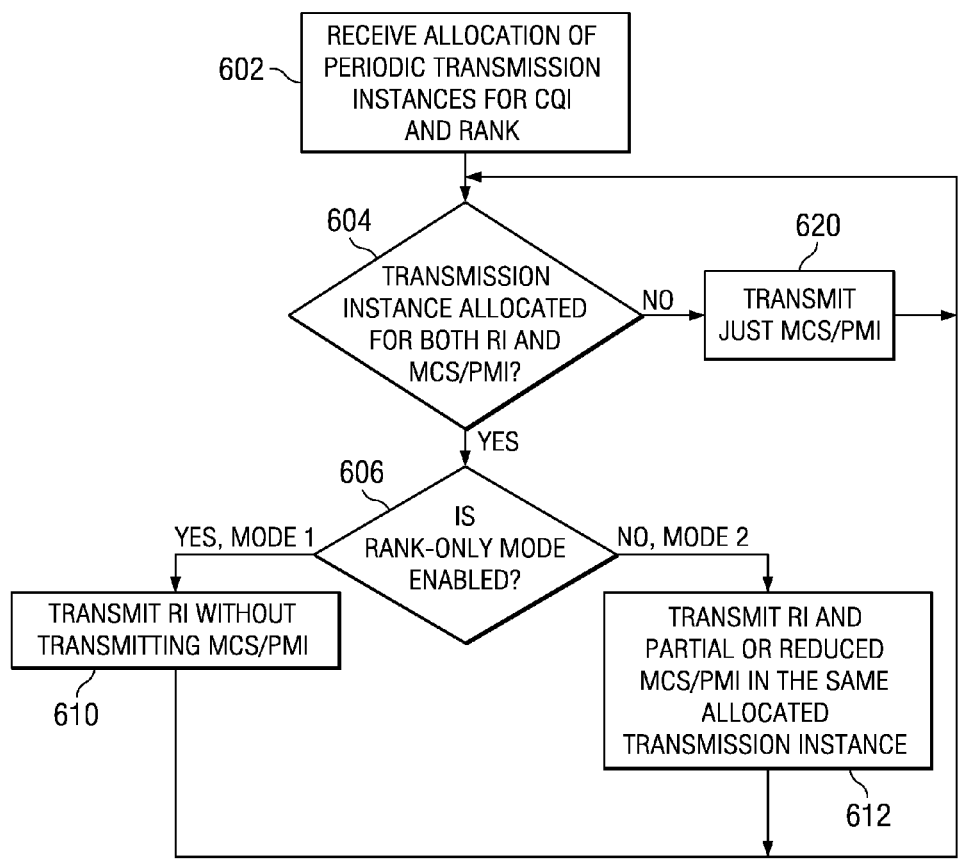
FIG. 6 is a flow diagram illustrating allocation and transmission of RI and MCS/PMI according to an embodiment of the present invention.

FIG. 6 is a flow diagram illustrating allocation and transmission of RI and MCS/PMI according to an embodiment of the present invention. As described above, partial CQI feedback may be used, either for all UE within a cell or for UE near an edge of the cell or for UE that are experiencing interference from various other sources. When a UE enters a cell, it receives 602 from the eNodeB serving the cell an allocation of a set of periodic transmission instances for CQI. It also receives 602 an allocation of a set of periodic transmission instances for rank indicator (RI). While RI is part of CQI, as discussed above it may have a different reporting interval that may be longer than the reporting interval for the other CQI information field(s), such as MCS and PMI. It also receives configuration information to instruct it as to which channel resources it is to use for transmission. In some embodiments, it also receives an indication of a mode of operation to use when RI and the other CQI information transmissions are both scheduled in the same transmission instance.

During a normal course of operation, a given UE transmits 620 just the non-RI CQI feedback information according to its periodic CQI allocation. At the end of each RI interval 604, RI will be transmitted in the allocated transmission instance. In some embodiments, RI will be transmitted 610 without transmitting the other CQI information field(s), such as MCS and PMI. In another embodiment, RI may be transmitted 612 with, e.g. partial MCS information, and with partial or no PMI information, as discussed in more detail above.

In some embodiments, a control message may have been transmitted 602 to the UE along with the transmission instance allocation to indicate 606 which mode to use when transmitting RI. In this case, in a first mode of operation, RI is transmitted 610 without transmitting the other CQI information field(s) in the transmission instance. In a second mode of operation, both the RI and partial CQI information are transmitted 612 in the transmission instance.

Note that this does not preclude the embodiment where RI is always transmitted without transmitting the other CQI field(s) in the transmission instance. That is, the control message 606 is not present. In this case, MCS and/or PMI are transmitted in instances where RI is not transmitted.

For embodiments in which a control message indicating a mode of operation is not used, then the UE will follow a default procedure. The default may be to transmit 610 an RI without transmitting other CQI field(s) in a transmission instance allocated for both RI and the other CQI field(s). Conversely, the default may be to transmit 612 the RI along with partial other CQI field(s).

The control message indicating a mode of operation may be sent 602 to all user equipment within a cell of the wireless network, or to particular UE based on interference levels, for example. Thus mode of operation may be common to all user equipments within a cell of the wireless network or may be selective.

In some embodiments, the control message 602 further indicates a mode of operation in a transmission instance allocated for both ACK/NAK and RI, wherein in one mode ACK/NAK is transmitted by modulating a reference signal (RS) of the transmission instance. In another mode, ACKNAK and RI are jointly coded, as described in more detail above.

Figure 7:
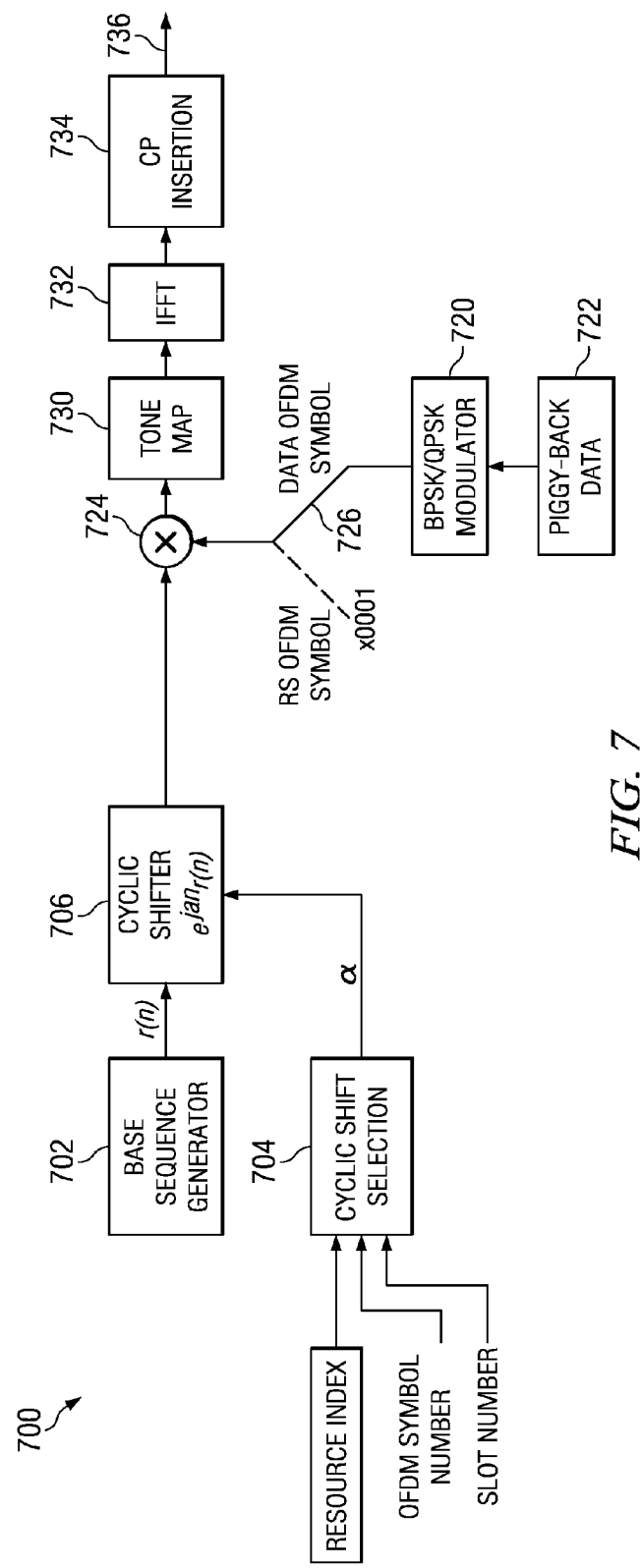
FIG. 7 is a block diagram of OFDMA modulation.
Figure 8:
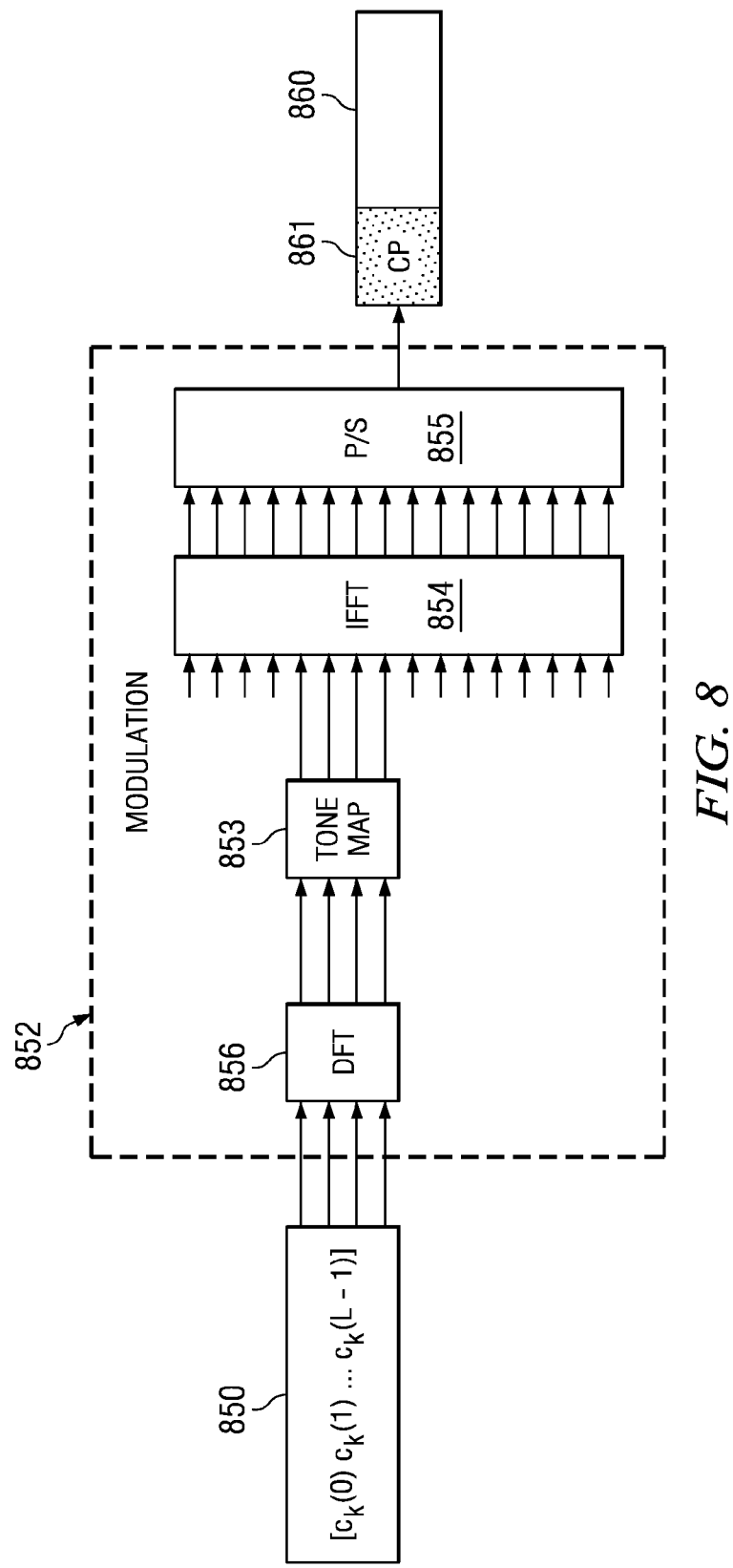
FIG. 8 is a block diagram of SC-FDMA modulation.

In various embodiments, CQI feedback is accomplished using one of the structures described in more detail in FIGS. 7 and 8, where a transmission instance comprises of a plurality of SC-FDMA symbols.

FIG. 7 is a block diagram of an illustrative orthogonal frequency-division multiplexing (OFDM) system transmitter 700 for transmitting the frame structures of FIG. 2. Elements of the transmitter may be implemented as components in a fixed or programmable processor by executing instructions stored in memory, for example, or by dedicated circuitry, for example. The UE generates a CAZAC-like (e.g. ZC or extended ZC or zero-autocorrelation QPSK computer-generated) sequence using base sequence generator 702. One embodiment of the CAZAC-like signal from generator 702 in FIG. 7 is a cyclically shifted or phase ramped CAZAC-like sequence, as described above in more detail with respect to Table 1. A cyclic shift value is selected for each symbol based on the resource index, the SC-FDMA symbol number and the slot number in cyclic shift selecting module 704. The base sequence is then shifted by cyclic shifter 706 on a symbol by symbol basis using shift values provided by cyclic shift selection module 704.

The separate RI and the other feedback data per SC-FDMA symbol is organized as either one or two bits in this embodiment and is input to modulator block 720. The data bearing SC-FDMA symbols are binary phase shift key (BPSK) or quadrature phase shift key (QPSK) modulated when the data information is one or two bits wide, respectively. The switch 726 selects, based on the SC-FDMA symbol type (data or RS), either the complex BPSK/QPSK constellation point or "1" as input to the complex multiplier 724.

The result of the element-wise complex multiplication is mapped onto a designated set of tones (sub—carriers) using the Tone Map 730. The UE next performs IFFT of the mapped signal using the IFFT 732. A cyclic prefix is created and added in module 734 to form a final fully formed uplink signal 736.

FIG. 8 illustrates an alternate modulation block 852 to that of FIG. 7. Block $[c_k(0) \ldots c_k(L-1)]$ 850 denotes the user signal of user k that includes separate RI and other CQI field feedback as described above. This user signal includes but is not limited to reference signal, data signal and control signal. Modulation block 852 includes discrete Fourier Transform (DFT) block 856, tone map 853, inverse Fast Fourier transform (IFFT) block 854 and parallel-to-serial (P/S) converter 855. In FIG. 8, the user signal is first processed by DFT block 856. Tone map 853 maps the user signal onto L sub-carriers as described above in conjunction with FIG. 7. IFFT block 854 converts these signals from frequency domain to temporal domain. Copies of modulation block 852 in FIG. 8 can service a plurality of UEs. The plural of signals from the plural UEs are transmitted on different sub-carriers at the same time period as designated by a UE specific tone map 853. Such a system is sometimes called single carrier orthogonal frequency division multiple access (SC-FDMA) system. These plural user signals, DFT blocks and tone maps are omitted for clarity. P/S converter 856 converts these parallel signals into a single serial signal 860. A cyclic prefix (CP) 861 is inserted by repeating a portion of the serial signal.

Figure 9:
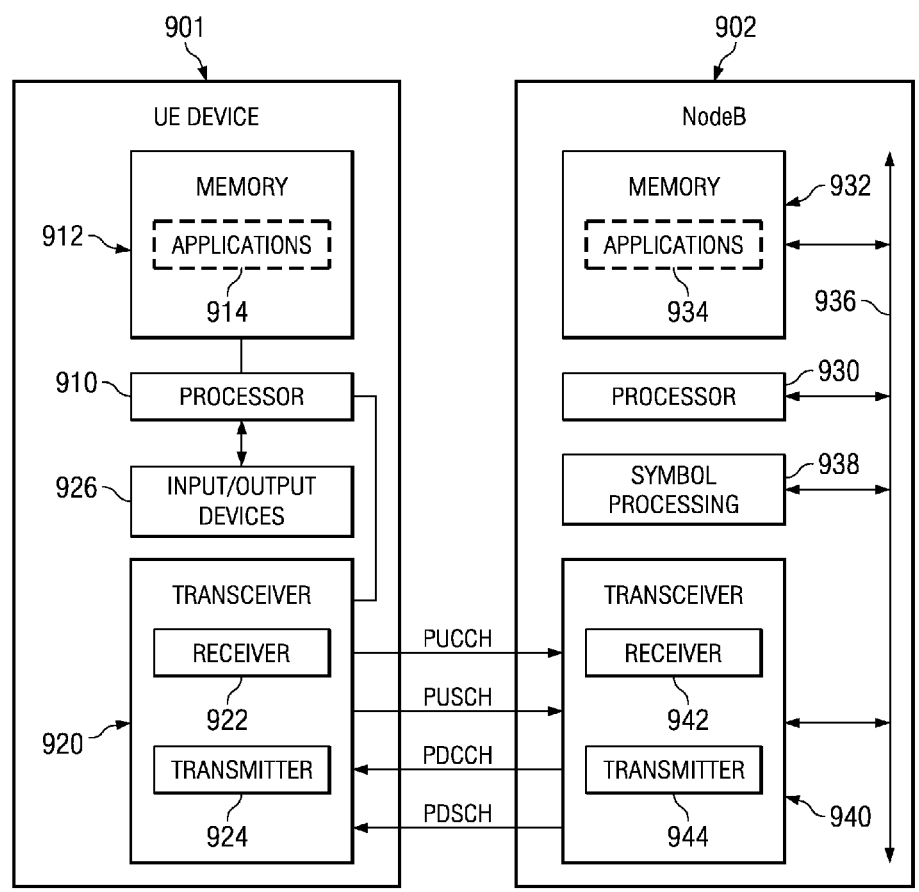
FIG. 9 is a block diagram of a Node B and a User Equipment for use in the network system of FIG. 1.

FIG. 9 is a block diagram illustrating operation of a eNodeB 902 and a mobile UE 901 in the network system of FIG. 1. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNodeB 902 based on a LTE or E-UTRAN protocol. Alternatively, another communication protocol now known or later developed can be used.

As shown, the mobile UE device 901 comprises a processor 910 coupled to a memory 912 and a Transceiver 920. The memory 912 stores (software) applications 914 for execution by the processor 910. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 901 to transmit UL signals to the eNodeB (base-station) 902 periodically or continuously via the transceiver 920. In at least some embodiments, the mobile UE device 901 identifies a Quality of Service (QoS) requirement when requesting an uplink resource from the eNodeB 902. In some cases, the QoS requirement may be implicitly derived by the eNodeB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

Transceiver 920 includes uplink logic which may be implemented by execution of instructions that control the operation of the transceiver. Some of these instructions may be stored in memory 912 and executed when needed by processor 910. As would be understood by one of skill in the art, the components of the Uplink Logic may involve the physical (PHY) layer and/or the Media Access Control (MAC) layer of the transceiver 920. Transceiver 920 includes one or more receivers 922 and one or more transmitters 924.

Processor 910 may send or receive data to various input/output devices 926. A subscriber identity module (SIM) card stores and retrieves information used for making calls via the cellular system. A Bluetooth baseband unit may be provided for wireless connection to a microphone and headset for sending and receiving voice data. Processor 910 may send information to a display unit for interaction with a user of the mobile UE during a call process. The display may also display pictures received from the network, from a local camera, or from other sources such as a USB connector. Processor 910 may also send a video stream to the display that is received from various sources such as the cellular network via RF transceiver 922 or the camera. It should be understood that UE 901 may contain more than one processor and that processor 910 is therefore representative of processing circuitry that may be embodied to perform the functions described herein.

During transmission and reception of voice data or other application data, transmitter 924 sends ACKNAK information and CQI feedback information via the PUCCH and/or the PUSCH links to the serving eNodeB 902, as described in more detail above. In particular, RI feedback is scheduled with a longer reporting interval than the other CQI information field(s). Rank indicator (RI) is transmitted on its scheduled reporting interval without transmitting the other CQI information field(s) in a transmission instance allocated for both RI and other CQI information field(s).

In this embodiment, control of the partial CQI feedback transmission is embodied by executing instructions stored in memory 912 by processor 910. In other embodiments, the scheme may be embodied by a separate processor/memory unit, by a hardwired state machine, or by other types of control logic, for example.

The CQI feedback subframes are then transmitted by transmitter 924, as described in more detail with regard to FIGS. 7-8.

NodeB 902 comprises a Processor 930 coupled to a memory 932, symbol processing circuitry 938, and a transceiver 940 via backplane bus 936. The memory stores applications 934 for execution by processor 930. The applications could comprise any known or future application useful for managing wireless communications. At least some of the applications 934 may direct the base-station to manage transmissions to or from the user device 901.

Transceiver 940 comprises an uplink Resource Manager, which enables the eNodeB 902 to selectively allocate uplink PUSCH resources to the user device 901. As would be understood by one of skill in the art, the components of the uplink resource manager may involve the physical (PHY) layer and/or the Media Access Control (MAC) layer of the transceiver 940. Transceiver 940 includes one or more receiver(s) 942 for receiving transmissions from various UE within range of the eNodeB and transmitter(s) 944 for transmitting data and control information to the various UE within range of the eNodeB.

The uplink resource manager executes instructions that control the operation of transceiver 940. Some of these instructions may be located in memory 932 and executed when needed on processor 930. The resource manager controls the transmission resources allocated to each UE that is being served by eNodeB 902 and broadcasts control information via the physical downlink control channel PDCCH.

Symbol processing circuitry 938 performs demodulation and reverse rate matching using known techniques. CQI feedback is received via receiver 942 via PUCCH or PUSCH from a particular UE that has provided partial CQI feedback, as described in more detail above. eNodeB 902 may combine several partial CQI feedback transmissions to determine a complete CQI status for a given UE. It is possible that different CQI reports on different time instances contain different CQI field(s), such that multiple CQI reports can be combined to provide a full or more completed CQI reports. In other words, different CQI reports on different time instances can be complimentary to each other. However, it is not precluded that eNodeB can use each CQI report alone, even when the CQI report contains partial CQI information, such as not including all CQI fields.

Other Embodiments

Various other embodiments of the invention will be apparent to persons skilled in the art upon reference to this description. For example, a larger or smaller number of symbols then described herein may be used in a slot. Other types of feedback may be separately embedded and transmitted in configured frames at various times. The term "frame", "subframe" and "slot" are not restricted to the structure of FIG. 2. Other configurations of frames and/or subframes may be embodied. In general, the term "frame" may refer to a set of one or more subframes. A transmission instance likewise refers to a frame, subframe, or other agreed upon quantity of transmission resource in which a feedback indication can be embedded.

While the disclosure has discussed a scheme for the transmission of feedback information with data on PUCCH that provides for partial CQI feedback capability, other embodiments may use the principles described herein to improve reliability for signaling other types of information that is routinely signaled between nodes in a network that have an aspect of dynamic variability in accuracy based on channel conditions.

Some embodiments of partial CQI feedback include, but are not limited to the following examples.

Only RI is reported.

Only MCS is reported, which may be the baseline MCS, the delta MCS, or both. A eNodeB or the UE transmitter can assume or use the RI and/or PMI which was fed back earlier. Alternatively, the eNodeB or transmitter can assume fixed RI and/or PMI.

Only PMI is reported. The eNodeB or UE transmitter can assume or use the RI and/or MCS which was fed back earlier. Alternatively, the eNodeB or transmitter can assume fixed RI and/or MCS.

MCS and PMI are reported, without RI. The eNodeB or UE transmitter can assume or use the RI which was reported (fed back) earlier. Alternatively, the eNodeB or transmitter can assume a fixed RI.

RI and MCS is reported, without PMI. The eNodeB or UE transmitter can assume or use the RI which was fed back earlier. Alternatively, the eNodeB or transmitter can assume a fixed PMI.

RI and PMI only are reported.

Sending CQI information with coarse frequency granularity to reduce the number of CQI reporting bits Sending RI and partial or restricted MCS information, with or without PMI
  a. Restrict the allowed MCS for MIMO transmission. Thus, fewer MCS bits need to be reported on CQI feedback. This restriction (possibly different restriction rules) applies to both the baseline MCS or the delta MCS.
  b. In case of spatial multiplexing with 2 codewords, only sends the baseline MCS. It is possible to send the delta MCS and/or baseline MCS in future CQI feedback, where RI may not be transmitted (or fed back)
  c. Restricting the usage of spatial multiplexing of 2 or more codewords, such that only 1 MCS is fed back 2. Sending RI and partial or restricted PMI information, with or without full/partial MCS information
  a. For example, by restricting the allowed precoding matrices, which reduces the number of PMI feedback bits.

It is not precluded that the proposed partial CQI feedback scheme is also implemented when CQI is fed back in data channel, e.g. PUSCH in 3GPP LTE.

As used herein, the terms "applied," "coupled," "connected," and "connection" mean electrically connected, including where additional elements may be in the electrical connection path. "Associated" means a controlling relationship, such as a memory resource that is controlled by an associated port. While the invention has been described with reference to illustrative embodiments, this description is not intended to be construed in a limiting sense.

It is therefore contemplated that the appended claims will cover any such modifications of the embodiments as fall within the true scope and spirit of the invention.

What is claimed is:

1. A method for transmission in a wireless network, comprising:
  receiving an allocation comprising a plurality of periodic transmission instances for a channel quality indicator (CQI), wherein the CQI comprises a rank indicator (RI) and at least one other CQI field;

receiving a schedule comprising a plurality of periodic transmission instances for the RI; and transmitting a first RI without transmitting the other CQI fields in a first transmission instance of the plurality of periodic transmission instances allocated for both RI and other CQI fields.

2. The method of claim 1, wherein the other CQI fields comprise a modulation and coding scheme (MCS) index associated with a channel coding rate value and modulation scheme, and a precoding matrix indicator (PMI).

3. The method of claim 1, wherein the other CQI fields comprise only a modulation and coding scheme (MCS) index associated with a channel coding rate value and modulation scheme.

4. The method of claim 1, further comprising receiving a control message indicating a mode of operation in a transmission instance allocated for both the RI and the other CQI fields, wherein in a first mode of operation, the first RI is transmitted without transmitting the other CQI fields in the first transmission instance; wherein in a second mode of operation, both the first RI and a portion of the other CQI fields are transmitted in the first transmission instance.

5. The method of claim 4, wherein a transmission instance comprises a plurality of single carrier orthogonal frequency division multiple access (SC-FDMA) symbols and furthermore, at least one SC-FDMA symbol is used for the transmission of the RI and at least another SC-FDMA symbol is used for the transmission of the other CQI fields.

6. The method of claim 1, wherein a same channel resource is used for the transmission of both the RI and the other CQI fields.

7. The method of claim 6, wherein the channel resource corresponds to a selected cyclic shift of a designated sequence within a given physical resource block.

8. The method of claim 1, wherein an ACK/NAK is transmitted in the same transmission instance as the RI, wherein the ACK/NAK is transmitted by modulating a reference signal (RS) of the transmission instance.

9. Apparatus for use in a wireless network, comprising:
processing circuitry, the processing circuitry controllably coupled to receiver circuitry and to transmitter circuitry;
storage logic controlled by the processing circuitry;
the receiver logic operable to receive and store in the storage logic a resource allocation comprising a plurality of periodic transmission instances for channel quality indicator (CQI) feedback and a schedule comprising a plurality of periodic transmission instances for rank indicator (RI) feedback, wherein the CQI comprises RI and at least one other CQI fields; and
the transmit circuitry being operable transmit a first RI without transmitting the other CQI fields in a first transmission instance allocated for both RI and other CQI fields.

10. The apparatus of claim 9, wherein the other CQI fields comprise a modulation and coding scheme (MCS) index associated with a channel coding rate value and modulation scheme, and a precoding matrix indicator (PMI).

11. The apparatus of claim 9, wherein the other CQI fields comprise only a modulation and coding scheme (MCS) index associated with a channel coding rate value and modulation scheme.

12. The apparatus of claim 9, wherein the receiver logic is further operable to receive and store in the storage logic a control message indicating a mode of operation in a transmission instance allocated for both RI and other CQI fields; and wherein in a first mode of operation, the transmitter logic is operable to transmit the first RI without transmitting the other CQI fields in the first transmission instance, and in a second mode of operation, the transmitter logic is operable to transmit both the first RI and a portion of the other CQI fields in the first transmission instance.

13. The apparatus of claim 12, wherein a transmission instance comprises a plurality of single carrier orthogonal frequency division multiple access (SC-FDMA) symbols and furthermore, at least one SC-FDMA symbol is used for the transmission of RI and at least another SC-FDMA symbol is used for the transmission of the other CQI fields.

14. The apparatus of claim 9, wherein a same channel resource is used for the transmission of both the RI and the other CQI fields, wherein the channel resource corresponds to a selected cyclic shift of a designated sequence within a given physical resource block.

15. The apparatus of claim 9, wherein the transmitter logic is operable to transmit an ACK/NAK in the same transmission instance as the RI, wherein the ACK/NAK is transmitted by modulating a reference signal (RS) of the transmission instance.

16. A method for transmission in a wireless network, comprising:
transmitting to a user equipment in the network an allocation comprising a plurality of periodic transmission instances for a channel quality indicator (CQI), wherein the CQI comprises a rank indicator (RI) and at least one other CQI field;
transmitting to the user equipment a RI reporting interval comprising a plurality of periodic transmission instances for the RI; and
receiving from the user equipment a first RI without receiving the other CQI fields in one of the plurality of periodic transmission instances allocated for both RI and other CQI fields.

17. The method of claim 16, wherein the other CQI fields comprise a modulation and coding scheme (MCS) index associated with a channel coding rate value and modulation scheme, and a precoding matrix indicator (PMI).

18. The method of claim 16, wherein the other CQI fields comprise only a modulation and coding scheme (MCS) index associated with a channel coding rate value and modulation scheme.

19. The method of claim 16, further comprising transmitting to the user equipment a control message indicating a mode of operation in a transmission instance allocated for both RI and other CQI fields, wherein in a first mode of operation, a first RI is received without receiving the other CQI fields in a first transmission instance; wherein in a second mode of operation, both the first RI and a portion of the other CQI fields are received in the first transmission instance.

20. The method of claim 19, wherein a transmission instance comprises a plurality of single carrier orthogonal frequency division multiple access (SC-FDMA) symbols and furthermore, at least one SC-FDMA symbol is used for the transmission of the RI and at least another SC-FDMA symbol is used for the transmission of the other CQI fields.

21. The method of claim 16, wherein both the RI and the other CQI fields are received on a same channel resource.

22. The method of claim 21, wherein the channel resource corresponds to a selected cyclic shift of a designated sequence within a given physical resource block.

23. The method of claim 16, wherein an ACK/NAK is received from the user equipment in the same transmission instance as the first RI, wherein the ACK/NAK is determined by demodulating a reference signal (RS) of the same transmission instance.

24. A method of reporting partial CQI feedback, comprising:
- reporting an allocation comprising a plurality of periodic transmission instances for a channel quality indicator (CQI), wherein the CQI comprises a rank indicator (RI) and at least one other CQI field;
- reporting a schedule comprising a plurality of periodic transmission instances for the RI; and
- sending a first RI without transmitting the other CQI fields in a first transmission instance of the plurality of periodic transmission instances allocated for both RI and other CQI fields.

25. The method of claim 24, wherein the other CQI fields comprise a modulation and coding scheme (MCS) index associated with a channel coding rate value and modulation scheme, and a precoding matrix indicator (PMI).

26. The method of claim 24, wherein the other CQI fields comprise only a modulation and coding scheme (MCS) index associated with a channel coding rate value and modulation scheme.

27. The method of claim 24, further comprising reporting a control message indicating a mode of operation in a transmission instance allocated for both the RI and the other CQI fields, wherein in a first mode of operation, the first RI is sent without sending the other CQI fields in the first transmission instance; wherein in a second mode of operation, both the first RI and a portion of the other CQI fields are sent in the first transmission instance.

28. The method of claim 27, wherein a transmission instance comprises a plurality of single carrier orthogonal frequency division multiple access (SC-FDMA) symbols and furthermore, at least one SC-FDMA symbol is used for the sending of the RI and at least another SC-FDMA symbol is used for the sending of the other CQI fields.

29. The method of claim 24, wherein a same channel resource is used for the sending of both the RI and the other CQI fields.

30. The method of claim 29, wherein the channel resource corresponds to a selected cyclic shift of a designated sequence within a given physical resource block.

31. The method of claim 24, wherein an ACK/NAK is sent in the same transmission instance as the RI, wherein the ACK/NAK is sent by modulating a reference signal (RS) of the transmission instance.

* * * * *